Dec. 18, 1962 A. M. DAILY ET AL 3,069,598

MODULAR ELECTRONIC CIRCUIT DEVICE

Filed Dec. 10, 1959 2 Sheets-Sheet 1

Inventors
Arthur M. Daily
Joseph R. Woods
By Ira Milton Jones
Attorney

Dec. 18, 1962 A. M. DAILY ET AL 3,069,598

MODULAR ELECTRONIC CIRCUIT DEVICE

Filed Dec. 10, 1959 2 Sheets-Sheet 2

Inventors
Arthur M. Daily
Joseph R. Woods
By Ira Milton Jones
Attorney

United States Patent Office 3,069,598
Patented Dec. 18, 1962

3,069,598

MODULAR ELECTRONIC CIRCUIT DEVICE

Arthur M. Daily, Edwardsburg, Mich., and Joseph R. Woods, Frankfort, Ind., assignors, by mesne assignments, to CTS Corporation, Elkhart, Ind., a corporation of Indiana Filed Dec. 10, 1959, Ser. No. 858,776
5 Claims. (Cl. 317—101)

This invention relates to electrical circuit components for radio and television receivers and other electronic apparatus, and has as its purpose to provide a compact unit of modular design and construction in which a relatively large number of individual components are structurally combined so that by assembling the one unit into the receiver or other electronic apparatus, all of the circuit components of the unit are simultaneously and correctly mounted in place.

More particularly this invention has as its purpose to provide a composite circuit component or control which features a plurality of similar interchangeable panels each of which has one or more circuit components thereon with terminals for the components projecting from an edge of the panel, and all of which panels are removably mounted in a common housing with the terminals thereon all projecting through one wall of the housing and parallel to one another so that the composite unit may be quickly and easily assembled to a supporting panel with its many terminals accurately located with respect to circuitry printed on the supporting panel.

It is also the purpose of this invention to provide an improved electrical control device of the character described which incorporates one or more variable resistors which are so arranged and constructed that the stator elements thereof are carried by one of the removable panels while the rotor elements are jointly supported by the panel and an adjacent wall of the housing.

Another object of this invention is to provide a control instrumentality of the character described in which resistors both fixed and variable may be combined with capacitors.

Still another object of this invention is to provide a control of the character described wherein the components on different removable panels are internally bridged within the control housing so that a minimum number of external control terminal means are required to assemble the entire unit into an electronic apparatus.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best modes so far devised for the practical application of the principles thereof, and in which.

Figures 1, 2:
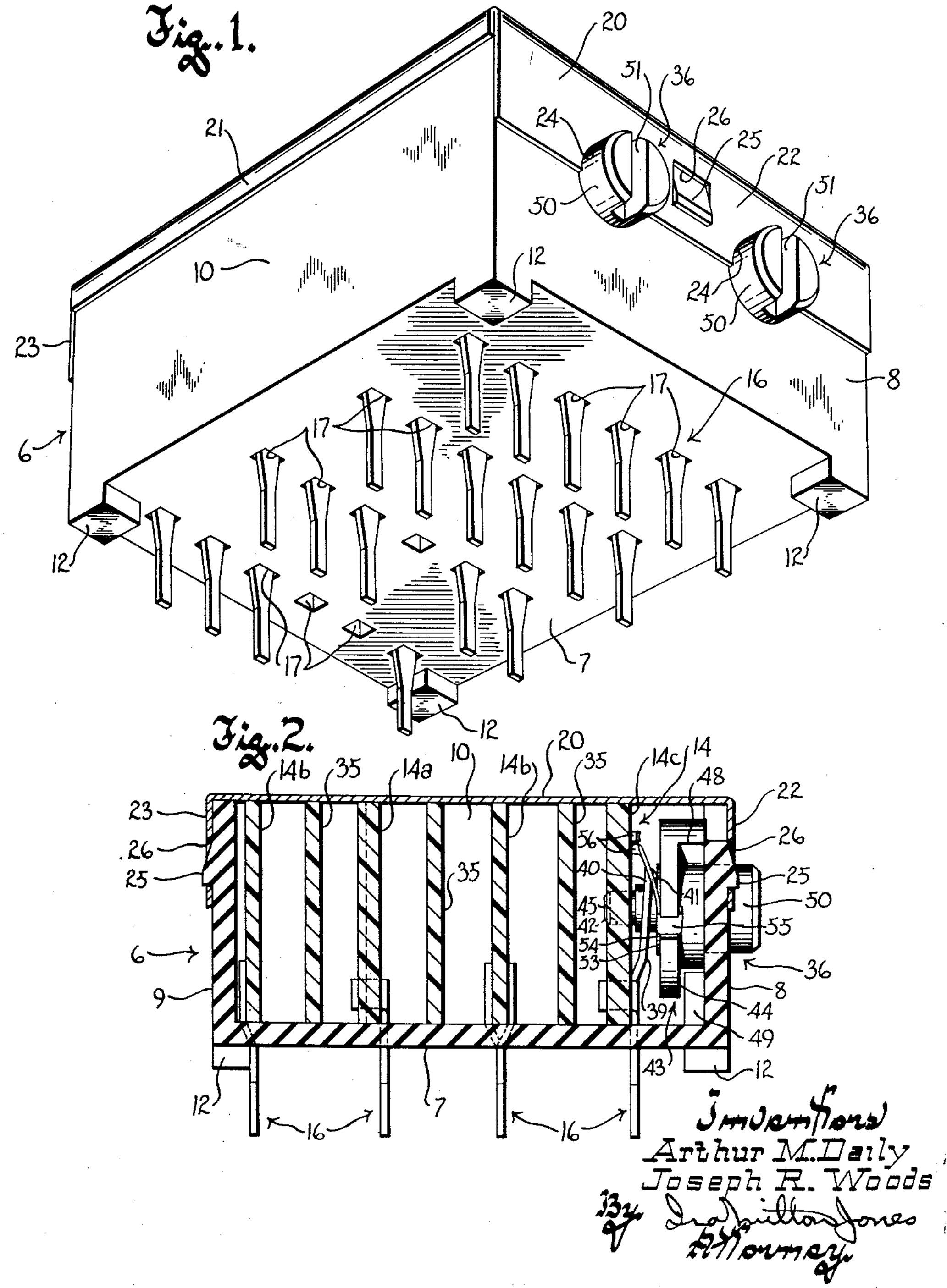
FIGURE 1 is a perspective view of the complete control device of this invention said view showing the device essentially from the bottom to illustrate the arrangement of its terminals.
FIGURE 2 is a longitudinal sectional view through the complete control unit.

Referring now particularly to the accompanying drawings in which like reference characters indicate like parts, the numeral 6 designates generally the housing of the composite control of this invention. This housing is made of insulating material and is preferably molded of a general purpose phenolic. It is box-like and has a bottom wall 7, a pair of end walls 8 and 9, and a pair of side walls 10. The end walls 8 and 9 may be considered front and rear walls respectively, since in the particular embodiment of the invention illustrated the wall 8 normally would constitute the front of the control.

Figures 3, 4, 5:
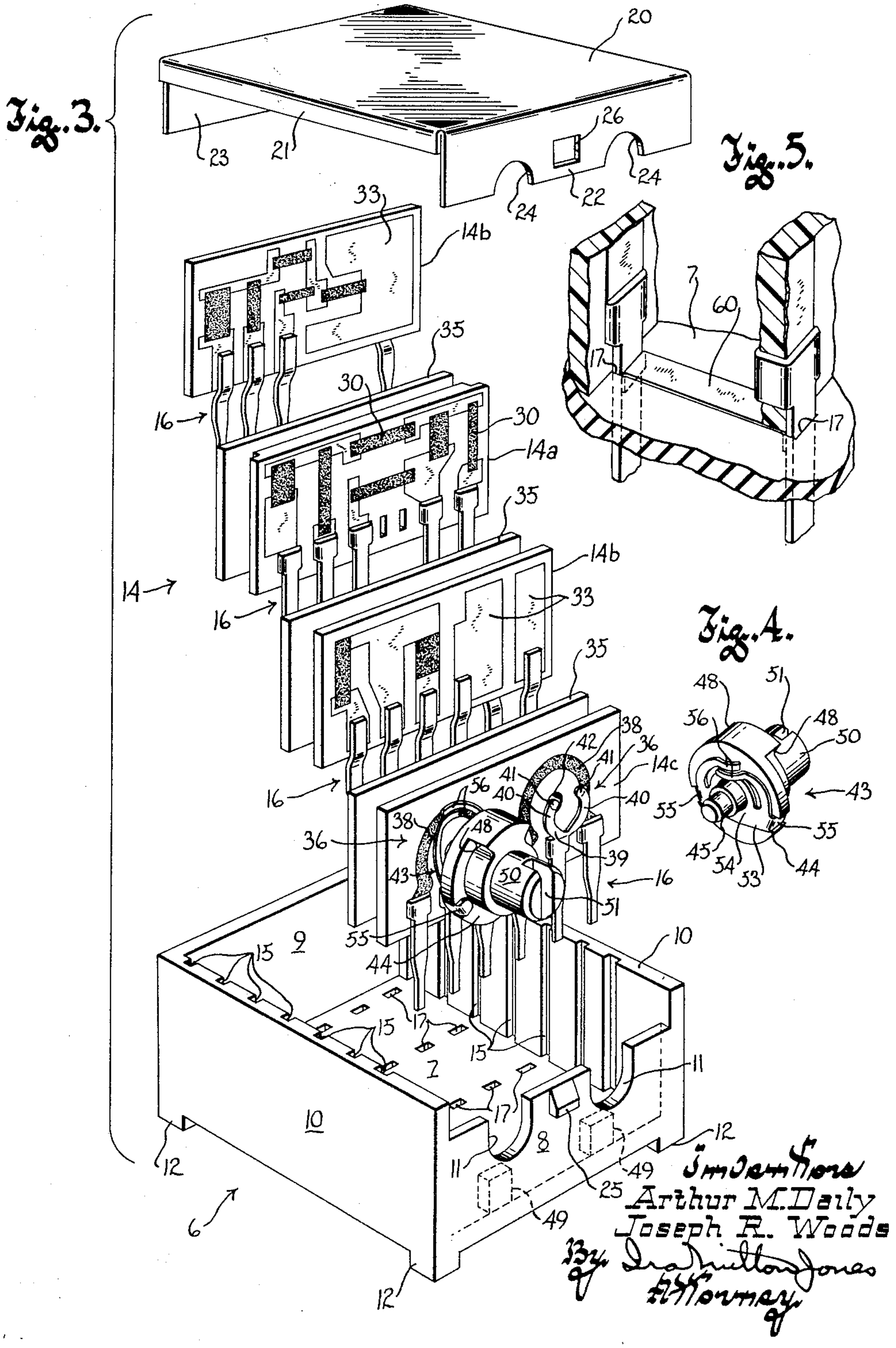
FIGURE 3 is an exploded perspective view of the control device.
FIGURE 4 is the perspective view of one of the rotor elements of the two variable resistors which form part of the complete control.
FIGURE 5 is a fragmentary perspective view illustrating an added feature of the invention.

As best shown in FIGURE 3 the rear end wall 9 and the side walls 10 are of uniform height so that the top edges thereof are coplanar and parallel with the bottom wall 7, but the front wall 8 is lower and has its top edge spaced down from the edges of the adjacent side walls 10. Two side-by-side round bottomed notches 11 in the front end wall 8, open upwardly to its top edge, for a purpose to be described; and preferably the housing is equipped with short legs 12 at its corners, to support the same on a base not shown.

Inside the housing there is a plurality of removable panels collectively and generally designated by the numeral 14. These panels are substantially alike in size so as to be positionally interchangeable, and they are removably held in parallel spaced apart relation by having their ends slidably received in vertical inwardly facing grooves 15 in the side walls 10. Each panel has one or more circuit components thereon along with printed circuitry and all have terminals 16 projecting down from the bottom edge thereof through holes 17 in the bottom wall 7. These terminals are electrically connected with their respective components, and are parallel with one another so that they may project through the holes 17 as the panels are inserted into the housing, the holes 17 being arranged in transversely extending rows in line with opposing grooves 15.

Since all of the terminals are parallel with one another it follows that the assembly of the complete unit or control into a radio or television receiver or other electronic apparatus for which it is designed is a simple matter of setting the control onto its supporting base or panel (not shown) with the ends of the several terminals extending down into or through appropriately located holes in the supporting panel to be connectable with printed circuitry thereon.

A cover 20, preferably stamped from sheet metal is detachably secured over the top of the housing to close the same and by engaging the upper edge of all of the panels, hold the same in place in the housing. The cover 20 has narrow side flanges 21 which overlie the side walls 10 and wider end flanges 22 and 23 which engage respectively over the end walls 8 and 9, the flange 22 having semi-circular notches 24 therein which coact with the notches 11 in the end wall 8 to form round openings into the housing. The cover 20 is removably held in place by detents consisting of lugs 25 on the end walls 8 and 9 and holes 26 in the cover flanges 22 and 23 to receive the lugs. The lugs have abrupt bottom surfaces to securely engage the adjacent edges of the holes 26, and sloping upper surfaces to facilitate snapping the cover in place.

In the embodiment of the invention illustrated, the removable panels 14 carry fixed resistors, fixed capacitors, combinations of the two, and at least one panel has variable resistors. The panel designated 14*a* has only fixed resistors 30 and appropriate printed circuitry thereon. Hence, it need not have the highest dielectric strength. Any relatively good insulated material such as phenolic, polyester epoxy, silicone or other plastic laminates may be used. However, those panels here designated by the numeral 14*b* which carry fixed capacitors, either alone or in combination with fixed resistors, must be made of insulating material having an extremely high dielectric constant (K). Barium titanate, with a K value of 3,500 as compared to 1 for air, has been found to be very satisfactory. The electrodes or plates 33 of the capacitors are applied to opposite sides of the ceramic panels by screening or any other suitable process, and are then fired at high temperatures.

Any suitable way of electrically connecting the terminals to the components may be employed, as for instance dip soldering the entire panel, or by spot soldering techniques.

Obviously, by having both fixed capacitors and fixed resistors mounted upon a common panel many different circuit arrangements and combinations can be accommodated through the simple expedient of appropriate printed circuitry on the panels; and since the panels are interchangeable, great latitude exists in the adaptation of the unit. In practice as many as twenty different components have been embodied in a single composite unit not much larger than one cubic inch.

If desired, insulating partitions 35 may be provided between the adjacent component carrying panels. These partitions are formed of suitable insulating material and are of the same size as the panels 14, and are held in place in the same way, namely, by having their opposite ends slidably received in certain of the grooves 15.

Two variable resistors 36 are located in the space between the front end wall 8 and the adjacent or foremost panel 14*c*. These variable resistors are of extremely simple design and construction and are specially well adapted for embodiment in the composite control instrumentality of this invention. Since the variable resistors are duplicates of one another, a description of one will suffice for both. The stator elements of the variable resistor, namely the arcuate resistance path 38 and the center or collector contact 39 are carried by the panel 14*c*. The resistance path is simply painted or otherwise applied to the side of the panel 14*c* which faces the front end wall 8 and its terminals have their anchored ends formed to embrace the low resistance ends of the resistance path. The center or collector contact 39 is a sheet metal stamping integral with its terminal. It has a substantially T-shaped formation with the shank thereof providing the terminal per se, and its laterally projecting arms providing the means by which the terminal is secured to the panel 14*c*. Above the head of the T-shaped stamping are two divergent curved spring fingers 40 which project resiliently forwardly from the panel 14*c*, and have their extremities rounded to provide smooth surfaced contacts 41. These spring fingers 40 substantially embrace a pilot hole 42 in the panel 14*c* and lie within the arcuate resistance path 38.

The rotor of each of the two variable resistors, designated generally by the numeral 43, comprises an integral molding of insulating material preferably a general purpose phenolic. The medial portion of this molding is a circular flange 44 having a flat rear face with a round pilot 45 projecting axially therefrom to be journaled in the pilot hole 42 in the assembled condition of the parts. A shoulder 46 on the pilot is engageable with the front face of the panel 14*c* to limit inward axial motion of the rotor.

The front of the flange 44 is stepped back for part of its circumference to provide circumferentially spaced shoulders 48 which coact with stop lugs 49 on the inside surface of the front end wall 8 of the housing to define the limits of rotation of the rotor. A stem 50 projecting axially from the front of the flange and coaxial with the pilot pin is journaled in the round opening formed conjointly by the bottom of the notch 11 in the end wall 8 and notch 24 in the adjacent cover flange. A cross slot 51 in the front end of the stem provides means for adjusting the variable resistor.

On the back face of the rotor flange is a bridging contactor 53. This bridging contactor is stamped from good conductivity spring metal and has a flat body portion 54 lying flat against the flange and apertured to permit the pilot pin to project therethrough. Substantially diametrically opposite tangs 55 on the flat body portion are clinched around the edge of the rotor flange to hold the contactor in place, and a pair of spring fingers 56 projecting from opposite portions of the contactor generally embrace the pilot pin and resiliently project rearwardly to have pressure engagement with the resistance path in the assembled condition of the parts. At the same time, the spring fingers 40 on the center or collector contact, engage the flat body portion 54 of the bridging contactor under spring tension. The rotor is thus yieldingly urged forwardly and to support the same against this forward thrust and assure the desired contact pressure, the front of the rotor flange 44 bears directly against the front end wall 8.

In assembling the resistors the rotors are first mounted on the panel 14*c* and then this sub-assembly is slipped down into position in the housing, such assembly being enabled by virtue of the upwardly opening notches 11 accommodating the stems 50 of the rotors; and when the cover 20 is secured in place the rotors are firmly held against displacement from their intended positions.

Though the control device illustrated has variable resistors only at the end that is adjacent to the end wall 8, it is obvious that a similar arrangement could be provided at the other end of the control and in that way the number of variable resistors could be doubled.

From the foregoing description taken in connection with the accompanying drawings, those skilled in this art will readily appreciate that this invention greatly facilitates the assembly of a large number of components into a receiver circuit or other electronic apparatus. This follows from the fact that the composite control of this invention can embody a large number of components into one unitary package. Hence, by the simple expedient of mounting the control upon the supporting panel with all of the terminals of the different components passing simultaneously through appropriate apertures in the supporting panel, all of the components are automatically correctly positioned for connection into their respective circuits. This is not only an easier and faster way of assembling a number of individual components into the receiver or other electronic apparatus, but also reliably error free. Heretofore costly assembly errors common in individual component assembly operations are virtually eliminated, as are the equally costly inspection procedures necessarily associated with those individual assembling operations.

Another significant and important advantage of the invention is that it attains the size reduction so necessary in modern electronic apparatus. For as already noted, within the relatively small volume of slightly more than one cubic inch, as many as 20 different components can be accommodated with this invention.

Another advantage of this invention is that it enables cross connecting components carried by separate panels even within the housing of the control unit itself. Thus as shown in FIGURE 5, where such cross connecting is desired the bottom wall of the housing may be provided with appropriately located bridging conductors or jumpers 60 reaching from a hole 17 in one of the transverse rows of holes, to a hole in another row. These jumpers may be provided in any suitable manner as by painting a conductor strip directly on the bottom wall, or even by a separate metal stamping. In any event the ends of the jumper should extend into the holes which it connects so as to make electrical contact with the terminals received in these holes.

What is claimed as our invention is:

1. In an electrical control for electronic circuits: a box-like housing of insulating material having end, side, and bottom walls, the bottom wall having a plurality of spaced apart parallel rows of holes extending transversely thereacross from side wall to side wall and parallel with the end walls; a panel of insulating material in the housing substantially above each row of holes and extending from side wall to side wall; interengaging means on the ends of said panels and the side walls removably holding the panels in said spaced apart parallel relationship each in line with one row of holes; means on one of the removable panels which is adjacent to an end wall of the housing providing the resistance path of a variable resistor, said path facing the adjacent end wall of the housing; means on said panel providing a collector contact for the variable resistor, also facing said end wall; a bridging contactor for the variable resistor in the space between said end wall and the adjacent removable panel, having a contact finger bearing on said resistance path and another portion bearing on the collector contact; actuating means connected with the bridging contactor and accessible through an opening in said end wall to enable adjustment of the bridging contactor from outside the housing; terminals fixed to said panel electrically connected with the resistance path and the collector contact, said terminals projecting downwardly from the bottom edge of the panel through adjacent holes in the bottom wall of the housing; printed circuitry, control components and terminals therefor on another of said removable panels, the terminals projecting downwardly from the bottom edge of the panel parallel to those of the first designated panel, and through adjacent holes in the bottom wall of the housing; and a cover secured over the top of the housing and holding said removable panels in place in the housing.

2. A variable resistor comprising: a box-like housing of insulating material having opposite end, side and bottom walls; a removable panel of insulating material in the housing behind one of said end walls; cooperating means on the opposite side walls and the adjacent ends of said panel removably holding the panel in parallel spaced relationship with the adjacent end wall; means on said panel providing an arcuate resistance path facing toward the adjacent end wall; the panel having a pilot pin hole centered with respect to the arcuate resistance path; means on said panel providing a center contact also facing towards said end wall; terminals fixed to the panel and electrically connected to the ends of the resistance path and to the center contact, said terminals projecting downwardly beyond the bottom edge of the panel and through holes in the bottom wall of the housing; a rotor of insulating material having a pilot pin at one end journaled in said pilot hole in the panel and having a stem at its other end coaxial with the pilot pin; the adjacent end wall of the housing having a notch opening to its upper edge and in which said stem is received; and a cover for the housing removably secured thereto with a part of the cover engaging the top edge of the panel to hold the same in place and another part thereof closing said notch and cooperating with the bottom of the notch to provide a bearing for the stem.

3. A variable resistor comprising: a housing of insulating material having spaced apart end walls, side walls, and a bottom wall, one end wall having an upwardly opening notch therein, the side walls having opposed vertically disposed guide surfaces equi-distant from said end wall, and the bottom wall having a plurality of holes arranged in a row substantially in line with said guide surfaces; a removable panel of insulating material inside the housing and extending from side wall to side wall with its opposite ends engaging said guide surfaces to be held thereby in parallel spaced relation to said end wall; means forming an arcuate resistance path on the panel facing said end wall; the panel having a pilot hole therein centered with respect to the arcuate resistance path; a center contact on the panel inside the arcuate resistance path and also facing said end wall; terminals fixed to the panel and electrically connected with the ends of the resistance path and center contact, said terminals projecting downwardly beyond the bottom edge of the housing; and through the holes in the bottom wall of the housing; a rotor of insulating material having a pilot pin projecting from one end thereof and an actuating stem coaxial with the pin and projecting from its opposite end, the pilot pin being journaled in said pilot hole in the panel and the stem being received in the bottom of said upwardly opening notch in the housing end wall; a bridging contactor on the rotor having a spring contact finger bearing upon the resistance path and another portion thereof engaging the center contact; a shoulder on the rotor bearing against the inner face of said end wall to axially locate the rotor and support the same against the thrust resulting from engagement of the spring contact finger with the resistance path; a cover for the housing closing its open top and bearing down upon the upper edge of the removable panel to hold the same in the housing; and a part on the cover engaging the stem on the rotor and holding the same in the bottom of the notch in said end wall.

4. The variable resistor of claim 3 further characterized by the fact that said center contact and its terminal are one integral stamping clinched to the panel with the center contact forming portion thereof shaped to provide a pair of resilient arms which embraces the pilot hole in the panel and project away from the panel to bear against the bridging contactor under spring tension.

5. In an electrical control device for electronic circuits, the combination of: a box-like housing of insulating material having bottom, side and end walls, the bottom wall having spaced apart parallel rows of holes extending transversely thereacross from side wall to side wall; removable panels of insulating material in the housing extending from side wall to side wall thereof; locating means on the side walls in line with said rows of holes engaging the ends of the panels to locate the same in spaced parallel relationship above said rows of holes while permitting the panels to be lifted out of the housing through the open top thereof, an endmost one of said panels forming the base of a variable resistor; means on said endmost panel providing an arcuate resistance path; means on said endmost panel providing a center contact for the variable resistor; a rotor for the variable resistor between said endmost panel and the adjacent end wall of the housing, including a bridging contactor engaging the center contact and the resistance path; an inwardly projecting pilot pin on the rotor journalled in said endmost panel; an outwardly projecting stem on the rotor coaxial with the pilot pin, said end wall of the housing having a notch opening to its top edge and in which the stem is received as said endmost panel is placed in position in the housing, the bottom of the notch supporting the stem; a cover removably secured to the housing and closing the top thereof, said cover holding the panels in the housing; a part on the cover closing said notch and cooperating with the bottom of the notch to provide a bearing for the stem; printed circuitry on said panels other than said endmost panel including fixed resistors; and terminals fixed to the panels and electrically connected to the printed circuitry thereon, the terminals of said endmost panel being connected to the ends of the resistance path and the center contact; all of said terminals projecting downwardly beyond the bottom edges of the panels and through adjacent holes in the bottom wall of the housing for connection with external circuitry, whereby the variable resistor may be connected in series with fixed resistors on certain of the panels to produce a total variable resistance which may be changed at will by simply exchanging one panel for another.

References Cited in the file of this patent

UNITED STATES PATENTS

| | | |
|---|---|---|
| 2,762,987 | Mackey | Sept. 11, 1956 |
| 2,794,081 | Luhn | May 28, 1957 |
| 2,798,140 | Kohring | July 2, 1957 |
| 2,877,389 | Wiener | Mar. 10, 1959 |
| 2,894,077 | McCoy | July 7, 1959 |
| 2,902,630 | Heazel | Sept. 1, 1959 |

FOREIGN PATENTS

| | | |
|---|---|---|
| 635,305 | Great Britain | April 5, 1950 |